United States Patent
Lynch (10) Patent No.: US 7,154,036 B2
(45) Date of Patent: Dec. 26, 2006

(54) METHOD AND APPARATUS FOR PREVENTING UNDESIRED CONTACT WITH ELECTRICAL CONDUCTORS

(76) Inventor: Michael D. Lynch, 7758 Pickering Cir., Reno, NV (US) 89511

(*) Notice: Subject to any disclaimer, the term of this patent is extended or adjusted under 35 U.S.C. 154(b) by 0 days.

(21) Appl. No.: 11/105,194

(22) Filed: Apr. 12, 2005

(65) Prior Publication Data
US 2006/0003622 A1    Jan. 5, 2006

Related U.S. Application Data

(63) Continuation-in-part of application No. 09/490,903, filed on Jan. 25, 2000, now Pat. No. 6,812,400.

(60) Provisional application No. 60/562,026, filed on Apr. 13, 2004.

(51) Int. Cl.
*H02G 3/04* (2006.01)
(52) U.S. Cl. ................ 174/5 R; 174/138 F
(58) Field of Classification Search ........ 174/1, 174/2, 5 R, 40 R, 135, 138 F, 139, 140 H; 119/174
See application file for complete search history.

(56) References Cited

U.S. PATENT DOCUMENTS

| | | | | |
|---|---|---|---|---|
| 3,019,287 A | * | 1/1962 | Newcomb, Jr. et al. | 174/5 R |
| 3,328,511 A | * | 6/1967 | Cagle et al. | 174/45 R |
| 3,639,678 A | * | 2/1972 | Muschong | 174/5 R |
| 3,639,681 A | * | 2/1972 | Ettlinger | 174/5 R |
| 4,136,372 A | * | 1/1979 | Oak | 174/5 R |
| 4,234,753 A | * | 11/1980 | Clutter | 174/5 R |
| 5,873,324 A | * | 2/1999 | Kaddas et al. | 119/174 |
| 6,730,852 B1 | * | 5/2004 | Puigcerver et al. | 174/5 R |
| 6,812,400 B1 | * | 11/2004 | Lynch | 174/5 R |

FOREIGN PATENT DOCUMENTS

DE    4115866 A1 * 11/1992

* cited by examiner

*Primary Examiner*—Dean A. Reichard
*Assistant Examiner*—Adolfo Nino
(74) *Attorney, Agent, or Firm*—Jack Jmaev (57) ABSTRACT

A bird guard comprising pivotally attached covers for conductors emanating from an insulator. The insulator is covered while maintaining the integrity of the insulator's dielectric properties. Prevention of contact with the conductor is accomplished by covering a portion of the conductor emanating in a first direction from an insulative support. Inadvertent exposure of the conductor emanating in the first direction is then prevented. A portion of the conductor proximate to the insulative support is covered. The afore mentioned technique is accomplished concurrently with maintaining the dielectric integrity of the insulative support

13 Claims, 10 Drawing Sheets

METHOD AND APPARATUS FOR PREVENTING UNDESIRED CONTACT WITH ELECTRICAL CONDUCTORS

RELATED APPLICATIONS

This application claims priority to a provisional application, Ser. No. 60/562,026 filed on Apr. 13, 2004, having the same title and filed by the same applicant, which itself claimed priority to Ser. No. 09/490,903 filed on Jan. 25, 2000 now U.S. Pat. No. 6,812,400 as a continuation-in-part.

BACKGROUND

An increasingly sensitive environmental issue is that of preventing injury to wildlife that may occur as a result of contact with energized electrical distribution components. Modernly, electrical distribution systems rarely provided any type of electrical barrier between energized components and other objects. For instance, electrical conductors that carry electrical power from power-pole to power-pole are typically devoid of any type of insulation. In the general sense, this is quite acceptable since electrical injury typically requires a complete circuit path phase to ground or phase to phase. Hence, a small bird may land on an electrical conductor without any adverse effects. This is because the small bird contacts only one electrical conductor and the current flowing through the conductor cannot find a "path to ground".

It is only when a living creature, including man or beast, contacts an exposed electrical conductor or other energized component and electrical current can find a path to ground that severe injury can occur. This type of unfortunate incident is more likely to occur where exposed electrical conductors are in close proximity to a grounded object or to another conductor or component that is carrying an opposite phase of a particular circuit.

In one example, a conductor, which is typically electrically isolated from a power pole by means of an insulator, can be contacted by a lineman or wildlife that has climbed the power pole. Such an insulator is also known as an insulative support. In one case, a living creature is in close enough proximity to ground by virtue of being in contact with the power pole that the slightest contact with an exposed electrical conductor or other energized component may prove fatal. Larger birds, such as raptors, are often killed when they land on or attempt to land on an exposed electrical conductor near a power-pole or on the power-pole itself. When landing on the conductor near a power-pole, a larger bird can touch the power-pole with a wing and provide a path to ground. A large bird may also short two opposite phases together. This results in a short circuit where electrical current flows through the body of the unfortunate bird from one phase to the other.

Insulative supports are designed to isolate a power phase either from ground or from another phase included in an electrical power distribution system. It is not uncommon that such insulative supports support dielectric strengths greater than 60,000 volts. In order to achieve such high voltage isolation, many insulative supports are designed with one or more "skirts". A skirt is a profile that elongates the dielectric distance of an insulator in an efficient manner and is more fully described infra.

It is in proximity to such an insulative support that many injuries occur. The need to avert such injuries has led to the development of a wide variety of covering means. For example, Tipsord describes in U.S. Pat. No. 2,871,282 an apparatus for covering a portion of a conductor proximate to an insulative support. The apparatus in Tipsord is clearly intended for short-term installation—perhaps during brief periods when a lineman is servicing the distribution system. According to Tipsord, a portion of a conductor proximate to an insulative support is covered together with the entire insulative support. This arrangement is unacceptable for long-term installations intended to help prevent injury to wildlife on a sustained basis. The reason for this is simple, by covering the entire insulative support, the dielectric integrity of the insulative support is compromised. The most notable means of such compromise is by shorting across one or more skirts included in an insulative support. One other problem associated with entirely covering an insulative support is that such covering precludes periodic maintenance of the insulative support. For example, an insulative support requires periodic cleaning because accumulation of particulate matter on the surface of a skirt also reduces its dielectric strength resulting in a compromise in dielectric integrity. This is because the particulate matter is typically a conductive substance.

SUMMARY

Disclosed are a method and apparatus for preventing contact with a conductor. Prevention of contact is accomplished by covering a portion of the conductor emanating in a first direction from an insulative support. Inadvertent exposure of the conductor emanating in the first direction is then prevented. A portion of the conductor proximate to the insulative support is covered. The afore mentioned technique is accomplished concurrently with maintaining the dielectric integrity of the insulative support.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
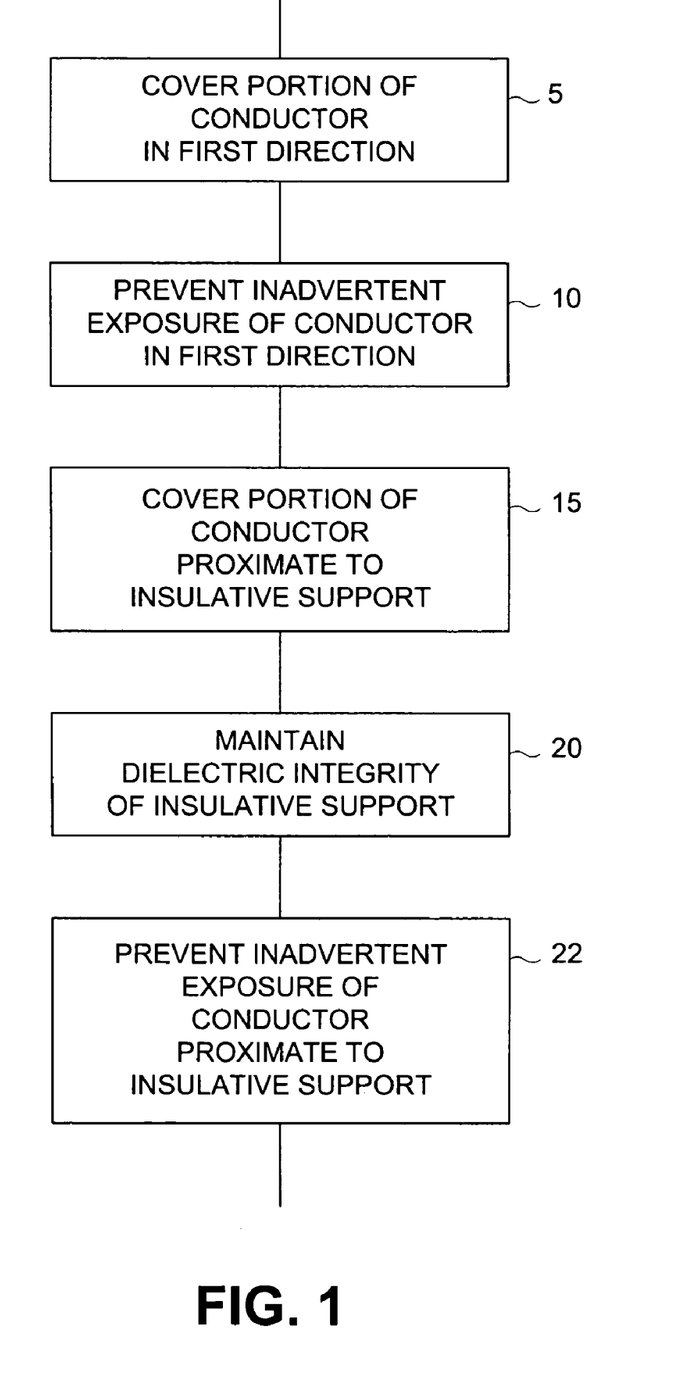
FIG. 1 is a flow diagram that depicts one example method for precluding inadvertent contact with an electrical conductor.

FIG. 1 is a flow diagram that depicts one example method for precluding inadvertent contact with an electrical conductor. The present method is generally applicable for a conductor that is supported by an insulative support. For example, a conductor can be supported by an insulative support mounted onto a power pole. Relative to the insulative support, the present method provides for covering a portion of the conductor emanating in a first direction away from the insulative support (step 5). The present method further provides for the prevention of inadvertent exposure of the conductor in the first direction (step 10). For example, a cover disposed to cover a portion of the conductor in the first direction may be secured in place to ensure that the cover does not dislodge or otherwise become displaced from an intended covering position, i.e. over the conductor. Any suitable means for securing the cover in its intended position may be used according to the present method.

The present method further provides for covering a portion of the conductor that is proximate to the insulative support (step 15). As discussed in the parent application referenced herein, one feature of the present method is to accommodate the insulative support so as to not compromise its dielectric integrity. Accordingly, the present method also provides for the maintenance of the dielectric integrity of the insulative support (step 20). Maintenance of the dielectric integrity of the insulative support, according to one variation of the present method, is accomplished by not substantially compromising the dielectric skirt distance of the insulative support. This is further defined infra. According to one alternative method, the present method further comprises the prevention of inadvertent exposure of the conductor proximate to the insulative support (step 22). A cover that is used to cover a portion of the conductor proximate to the insulative support may likewise become dislodged or otherwise displaced from its intended installation position. This can be prevented by securing the cover in its intended position. Any suitable means for securing the cover in its intended position may be used according to this variation of the present method.

Figure 2:
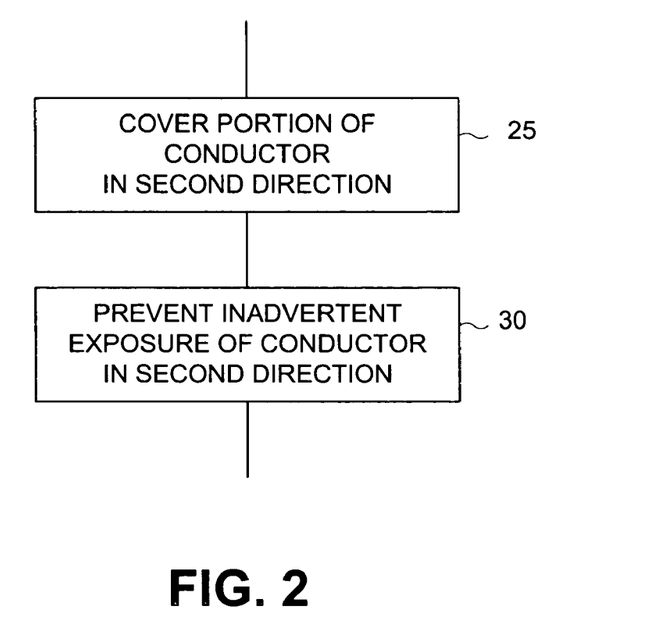
FIG. 2 is a flow diagram that depicts one alternative method for precluding inadvertent contact with an electrical conductor.

FIG. 2 is a flow diagram that depicts one alternative method for precluding inadvertent contact with an electrical conductor. According to this alternative method, an additional covering of a portion of the conductor emanating in a second direction away from the insulative support is provided (step 25). Inadvertent exposure of the conductor in the second direction is also provided (step 30). A cover that is provided for covering a portion of the conductor in the second direction may become dislodged or otherwise displaced from an intended covering position. Accordingly, any suitable means for securing the cover in its intended position may be used according to this alternative method.

Figure 3:
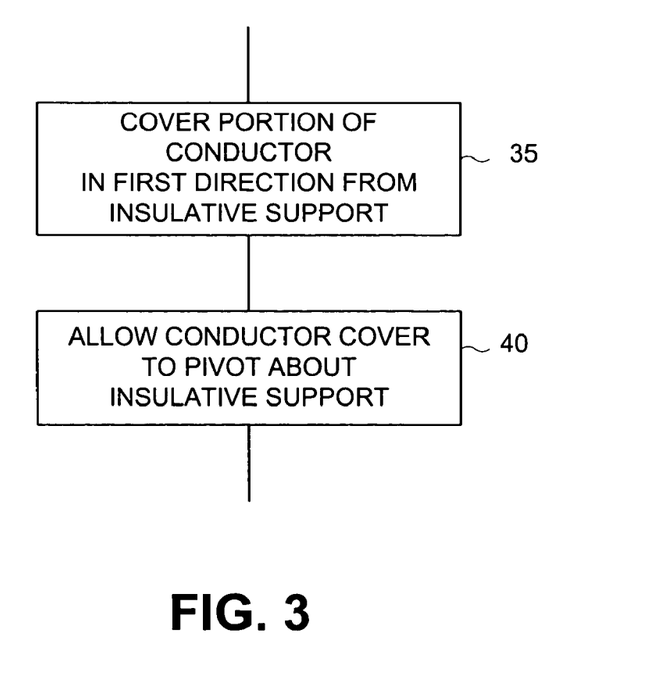
FIG. 3 is a flow diagram that depicts one alternative method for covering a portion of the conductor in a first direction relative to an insulative support.

FIG. 3 is a flow diagram that depicts one alternative method for covering a portion of the conductor in a first direction relative to an insulative support. A conductor that is suspended between two power poles is subject to various external forces, e.g. wind. When wind forces are applied to such a conductor, there is a tendency for the conductor to sway to and fro. As a result, a pivoting effect is realized relative to the insulative support used to support the conductor. One important factor that must be considered when wind forces are applied to the conductor is the fact that the conductor may not necessarily be exposed to the same type of wind forces on both sides of the insulative support. As result, the conductor on one side of the insulative support, i.e. in a first direction relative to the insulative support, may not sway sympathetically or synchronously with movement of the conductor on the other side of the insulative support, i.e. in a second direction relative to the insulative support. In order to properly accommodate this phenomenon, the present method provides for covering a portion of the conductor in a first direction (step 35) and allowing the conductor to freely pivot substantially about the insulative support (step 40). The term "freely" is hereby defined as allowing the conductor to pivot about the insulative cover in a substantially unencumbered manner. This, according to one alternative method, is accomplished by allowing the covering of a portion of the conductor emanating in the first direction to pivot about a covering of the conductor proximate to the insulative support itself. It should be noted that the actual pivot point need not necessarily be concentric with the insulative support. For example, the pivot point may be moved away from the insulative support in the first direction of the conductor by some convenient distance. The actual displacement of the pivot point away from the insulative support may be derived empirically and is typically a function of the width of any cover used to cover the conductor either proximate to the insulative support or a portion of the conductor in a first direction relative to the insulative support.

Figure 4:
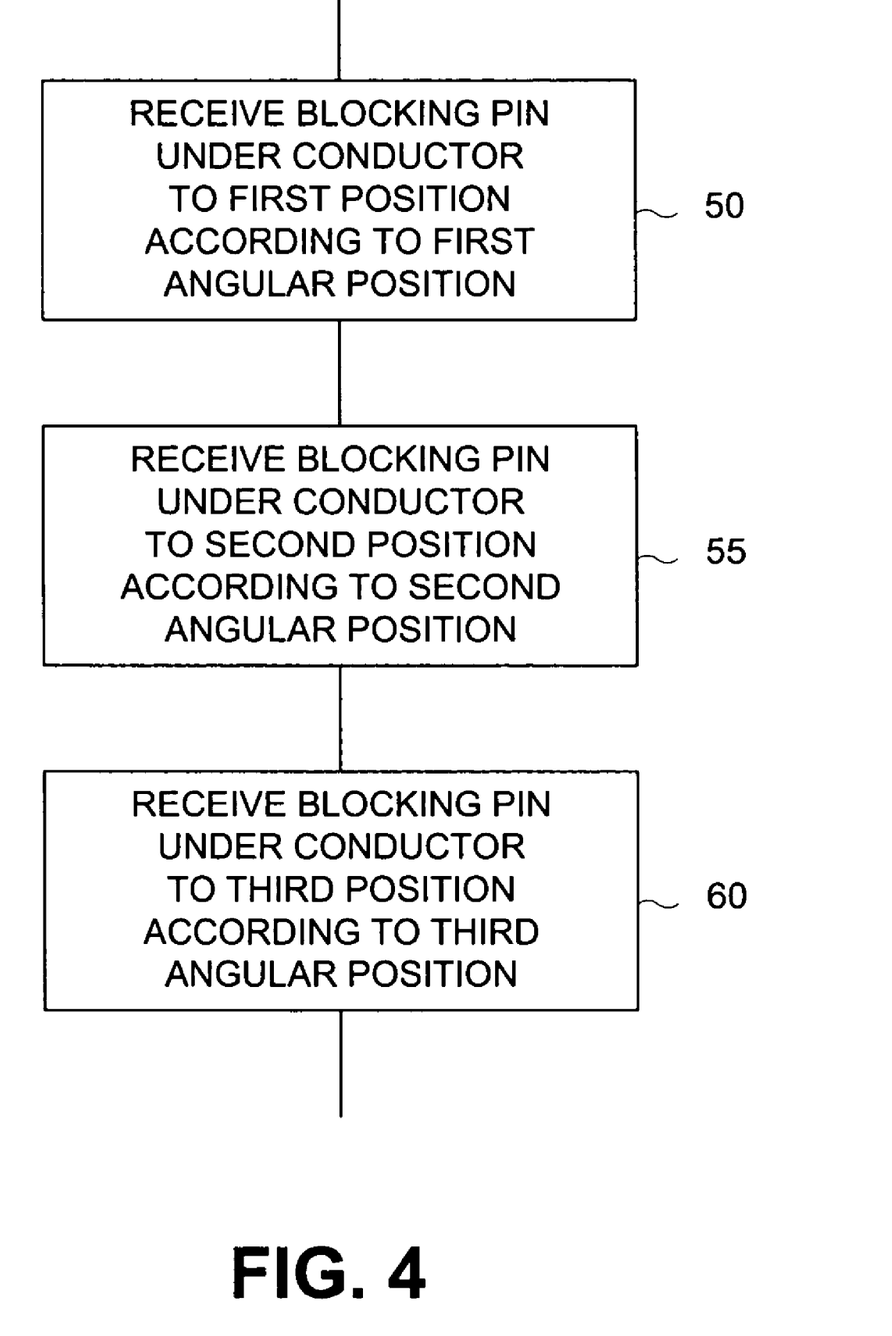
FIG. 4 is a flow diagram that depicts one example method for preventing inadvertent exposure of a portion of the conductor in a first direction.

FIG. 4 is a flow diagram that depicts one example method for preventing inadvertent exposure of a portion of the conductor in a first direction. A variation of this method may be used to prevent inadvertent exposure of a portion of the conductor in a second direction. In a typical application of the present method, a conductor cover is positioned over a conductor while the conductor is in place. Accordingly, any such conductor cover generally comprises a longitudinal opening so as to allow placement of the conductor cover over the conductor. In order to prevent a conductor cover from becoming dislodged or otherwise displaced from its intended covering position, this variation of the present method provides for receiving a blocking pin under the conductor that breaches the longitudinal opening at at least one point. To ensure that the blocking pin itself does not become disengaged, dislodged or otherwise displaced from its intended position of breaching the longitudinal opening, this example method provides for receiving the blocking pin to a first position according to a first angular position of the blocking pin (step 50). Typically, when the blocking pin is in this first angular position it is allowed to penetrate a first wall of a conductor cover and is allowed to continue to the inside of a second wall of the conductor cover, thereby breaching the longitudinal opening in the conductor cover. It should be noted that the blocking pin is allowed to penetrate the second wall of the conductor cover to a degree, but is precluded from further penetration when it is in this first angular position. The blocking pin is then received to a second position (further) under the conductor when it is rotated to a second angular position (step 55). In order to prevent the blocking pin from becoming displaced from its intended position, it is received to a third position (further) under the conductor when it is rotated to yet a third angular position (step 60). Accordingly, once in this third position the blocking pin can no longer be extracted beyond the second angular position unless it is again oriented into the second angular position. According to one variation of the present method, the first and third angular positions are substantially similar.

Figure 5:
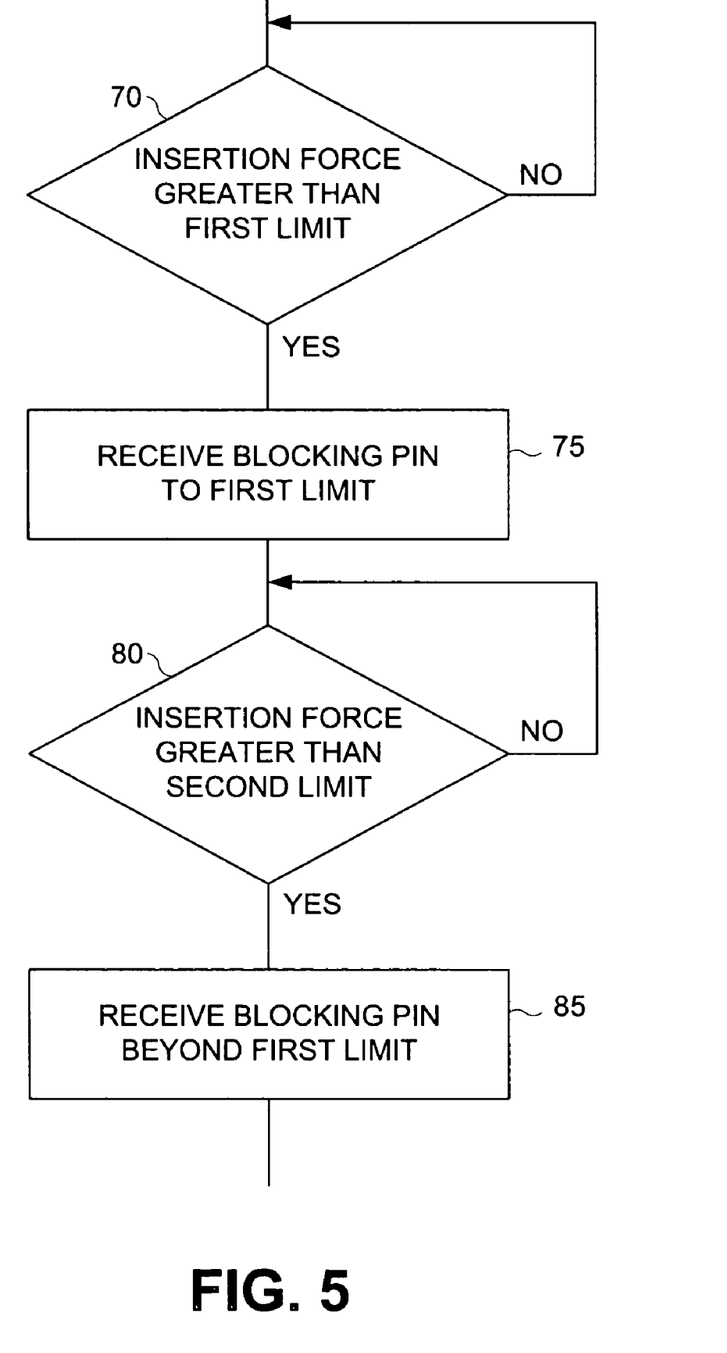
FIG. 5 is a flow diagram that depicts one alternative method for preventing inadvertent exposure of a portion of the conductor in a first direction.

FIG. 5 is a flow diagram that depicts one alternative method for preventing inadvertent exposure of a portion of the conductor in a first direction. According to this alternative method, a blocking pin is prevented from penetrating a first wall of a conductor cover unless its insertion force is greater than a first pre-established limit (step 70). Once the insertion force is greater than this first pre-established limit, the blocking pin is received to a first limit (step 75). This first limit is typically the inside of a second wall of the conductor cover. At this point, the blocking pin is breaching a longitudinal opening in a conductor cover. When additional insertion force is applied to the blocking pin so as to exceed a second pre-established limit (step 80), blocking pin is received beyond the first limit (step 85). Typically, the blocking pin is precluded from extraction unless extraction force exceeding the second pre-established limit is applied to the blocking pin. It should be appreciated that both the first and second pre-established insertion force limits may be substantially similar.

Figure 6:
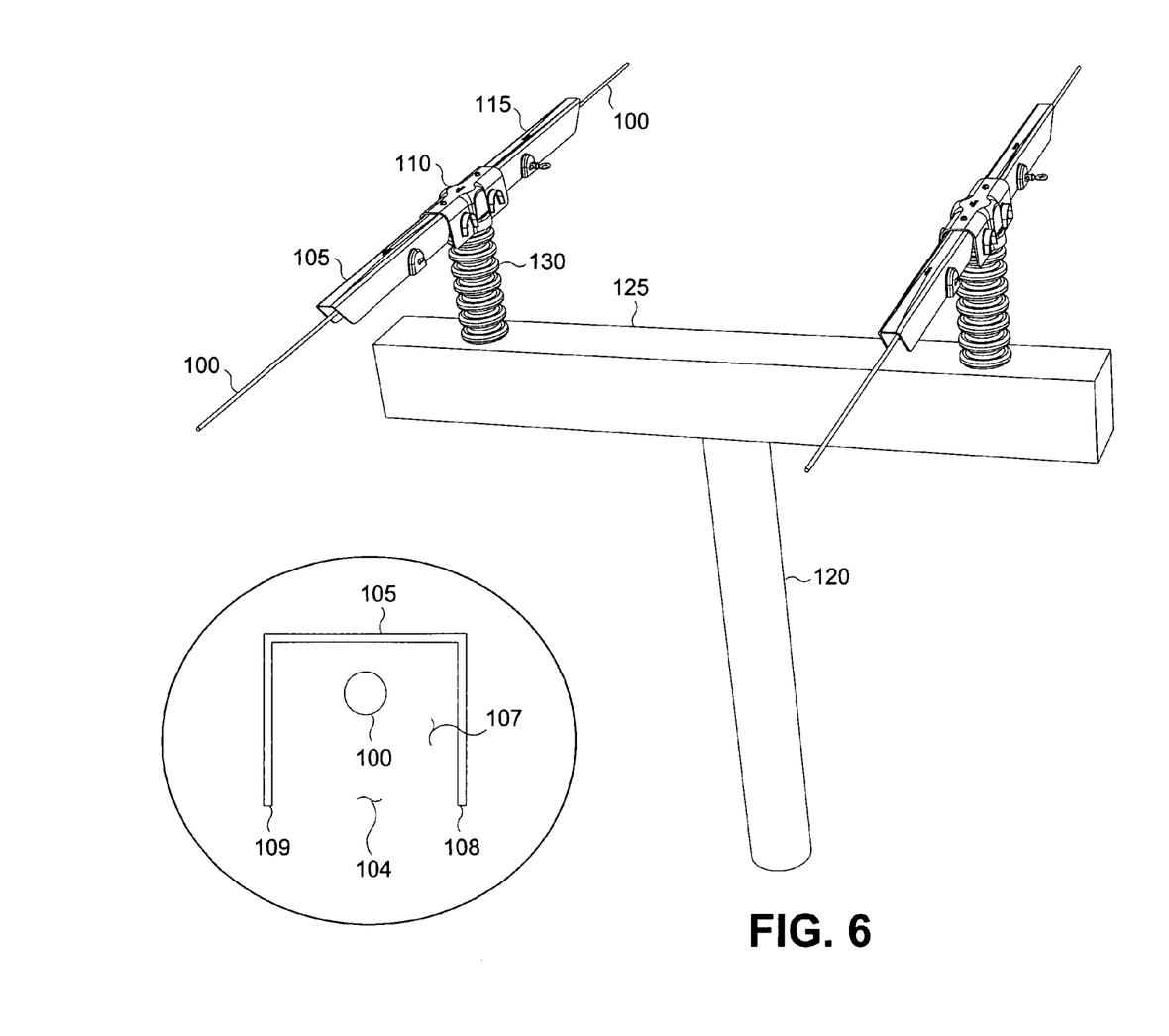
FIG. 6 is a pictorial illustration that depicts application of the present method to a conductor supported by an insulative support.

FIG. 6 is a pictorial illustration that depicts application of the present method to a conductor supported by an insulative support. The present method may be applied wherein a conductor 100 is supported by an insulative support 130. Typically, a power pole 120 is used to support a cross member 125. The insulative support 130 is generally supported by the cross member 125. In application, a portion of the conductor 100 emanating in a first direction away from the insulative support 130 is covered by a first arm 105. A portion of the conductor proximate to the insulative support 130 is covered by an insulator cap 110. An inset to FIG. 6 presents a cross sectional view of the first arm 105. The first arm 105 typically comprises an internal envelope 107 for receiving the conductor 100. The internal envelope 107, according to one example of embodiment, is formed by a first wall 108 and a second wall 109, substantially in opposition to each other. The first 108 and second 109 walls are bridged along their top sides leaving a longitudinal opening 104 along their bottom sides. Accordingly, the conductor 100 is received into the envelope 107 through the longitudinal opening 105. According to one alternative embodiment, a second arm 115 is used to cover a portion of the conductor 100 emanating in a second direction away from the insulative support 130. It should be understood that one embodiment of a conductor cover as herein described comprises an insulator cap 110 that maintains the dielectric integrity of the insulative support 130 and a first arm 105 having an internal envelope 107 for receiving a conductor 100. The first arm 105 is attached to the insulator cap 110 to form this example embodiment of a conductor cover. According to one alternative embodiment, a conductor cover further comprises a second arm 115 for covering a portion of the conductor 100 in a second direction substantially in opposition to the first direction.

Figure 7:
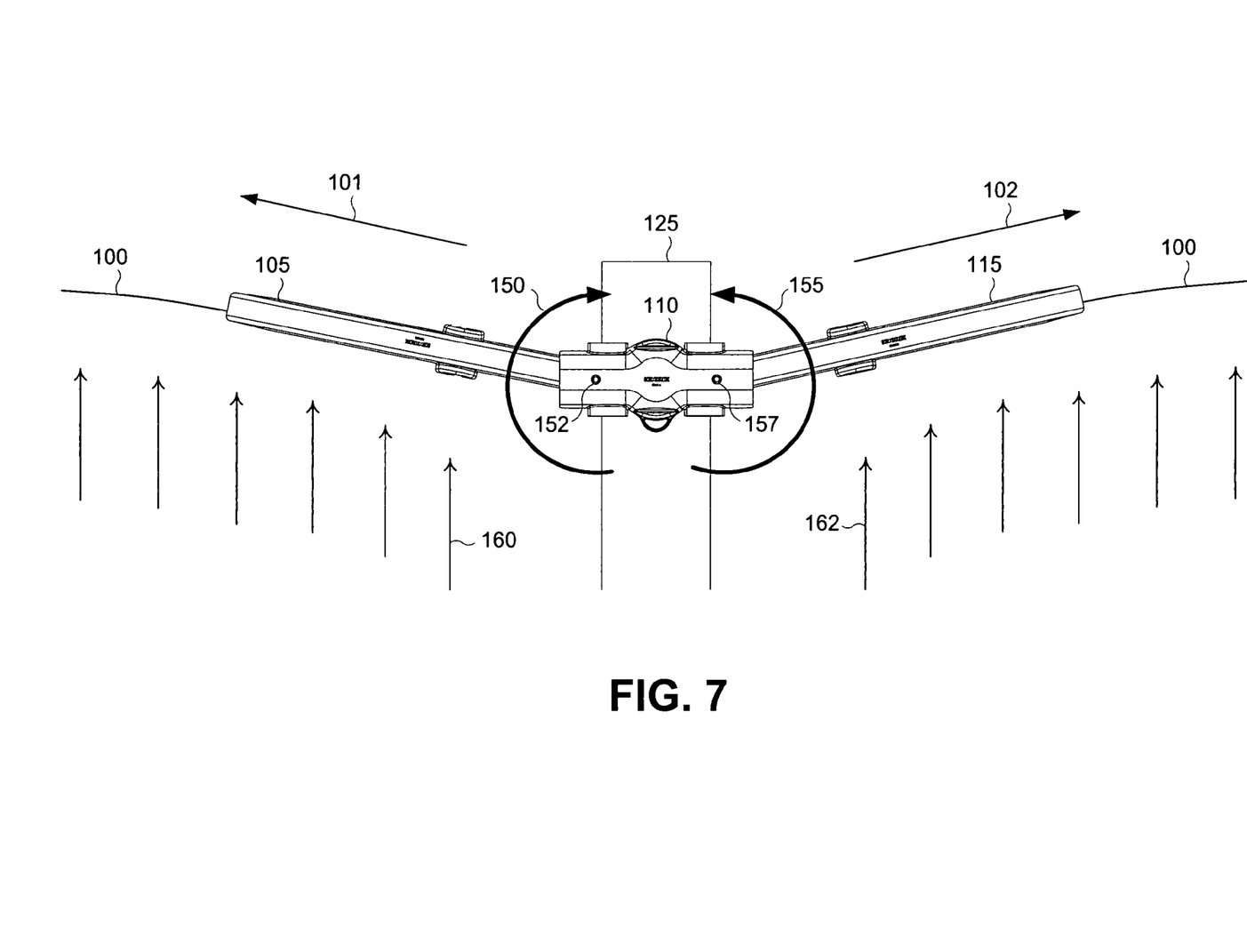
FIG. 7 is a pictorial diagram that illustrates one example embodiment of a conductor cover wherein an arm is pivotally attached to an insulator cap.

FIG. 7 is a pictorial diagram that illustrates one example embodiment of a conductor cover wherein an arm is pivotally attached to an insulator cap. According to this example embodiment, an arm 105 is pivotally attached to an insulator cap 110 by means of a first pin 152. The first arm 105 is thereby allowed to pivot 150 about the first pin 152. According to one alternative embodiment that further comprises a second arm 115; the second arm 115 is pivotally attached to the insulator cap 110 by means of a second pin 157. The second arm 115 is thereby allowed to pivot 155 about the second pin 157. Although not visible in this view, an insulative support is mounted on a cross member 125 is covered by the insulator cap 110. This insulator cap 110 serves to cover a portion of the conductor 100 is proximate to the insulative support. The conductor 100 is typically subjected to various external forces that cause the conductor 100 to pivot substantially about the insulative support.

In order to allow the conductor 100 to freely pivot about the insulative support, the first arm 105 and the second arm 115 are allowed to independently pivot substantially about the insulative support. It should be herein noted that each arm is allowed to pivot about a point that is not necessarily concentric with the insulative support as heretofore described in the teachings of the present method. One feature of the present embodiment is that each arm is allowed to pivot independently of the other. A first wind force 160 applied to the conductor 100 emanating in a first direction 101 away from the insulative support may not necessarily be equal to a second wind force 162 applied to the conductor 100 emanating in a second direction 102 away from the insulative support. In such case, the movement of the conductor 100 on one side of the insulative support may not necessarily be sympathetic or synchronous with movement of the conductor 100 on the other side of the insulative support. By allowing each arm to independently pivot substantially about the insulative support, the conductor 100 is allowed to move in a substantially unencumbered manner irrespective of disparate wind forces a conductor may experience on either side of the insulative support.

Figure 8:
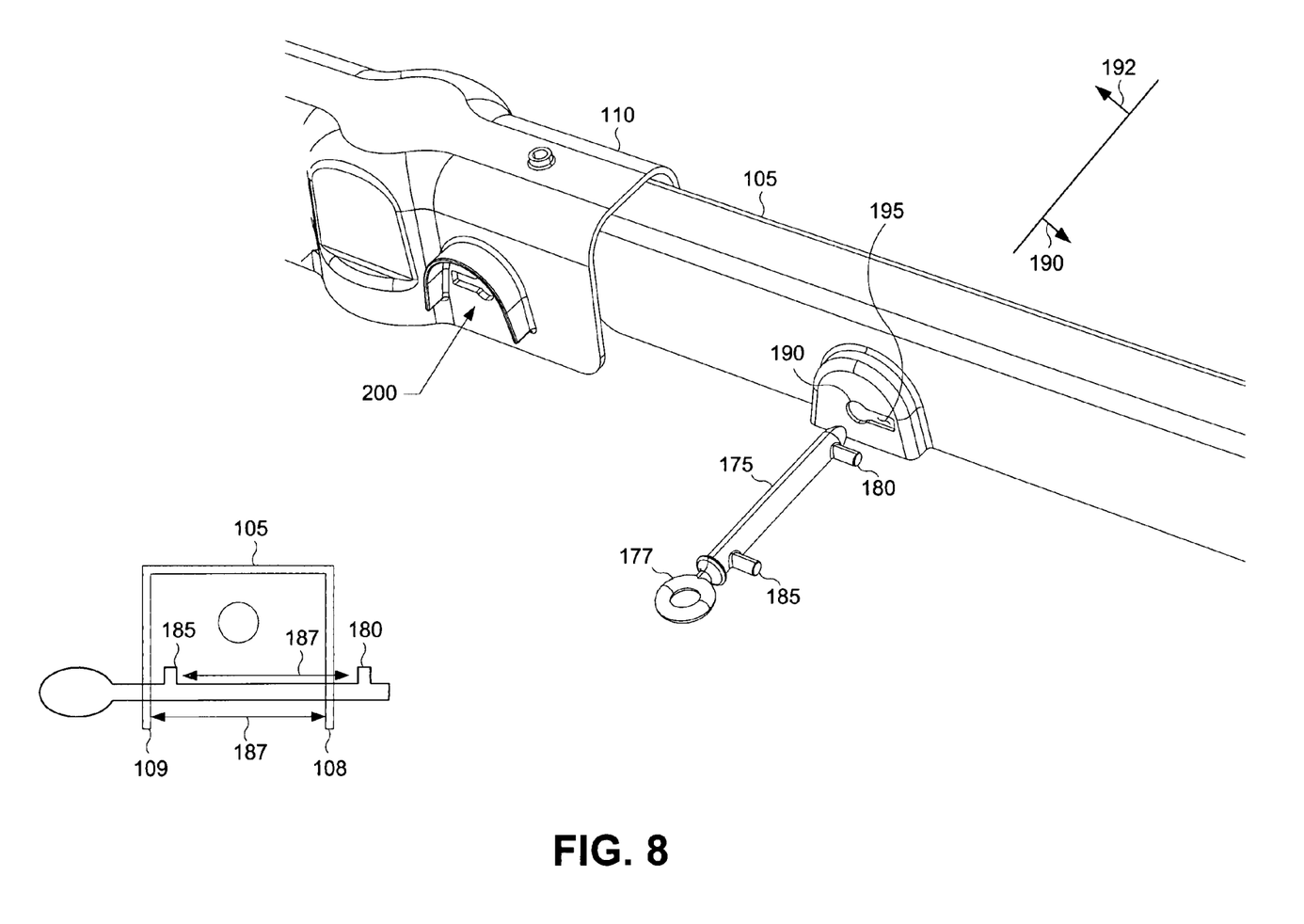
FIG. 8 is a pictorial diagram depicts one example embodiment of a retention pin apparatus.

FIG. 8 is a pictorial diagram depicts one example embodiment of a retention pin apparatus. According to this example embodiment, an arm 105 comprises a first keyed pin receptacle 190. The first keyed pin receptacle 190 comprises a keyway 195 oriented at a first angular position. According to one alternative embodiment, a conductor cover further comprises a restrictor pin 175. According to one example embodiment, a restrictor pin 175 comprises a first orthogonal stop 180 protruding from the body of the restrictor pin 175. A second orthogonal stop 185 is also included in this example embodiment of a restrictor pin 175. It should be noted that the second orthogonal stop 185 is optional. In the case with a second orthogonal stop 185 is provided, the second thought of stop 185 protrudes from the body the restrictor pin 175 in a second direction. It should be noted that according to one alternative embodiment the first and second orthogonal stops protruding from the body the restrictor pin 175 in substantially similar directions.

According to another alternative embodiment, the first and second orthogonal stops (180, 185) are spaced along the body of the restrictor pin 175 such that when the restrictor pin 175 is dispose in a position so as to restrict upward movement of the first arm 105 relative to a conductor, the first orthogonal stop 180 is located beyond a second wall 109 of the first arm 105. The second orthogonal stop 185 is located beyond a first wall 108 of the first arm 105. According to one example embodiment, the distance between the first and second orthogonal stops (180, 185) is substantially equal to the center-to-center distance between the first and second walls (108, 109) of the first arm 105. According to yet another alternative embodiment, the restrictor pin 175 further comprises a manipulation ring 177. The manipulation ring 177 may be used to manipulate the restrictor pin 175 using a common installation tool known as a "hotstick". It should be further noted that, according to one alternative embodiment of an insulator cap 110, an insulator cap 110 comprises a substantially similar retention pin apparatus most notably embodied as keyed slots 200 in substantially opposing walls comprising the insulator cap 110. It should also be noted that the keyed slot 190 in a first wall 108 is situated at a first angular position in that a keyed slot 192 in a second wall 109 is generally oriented at a disparate angular position, e.g. 180 degrees relative to the first keyed slot 190.

Figure 9:
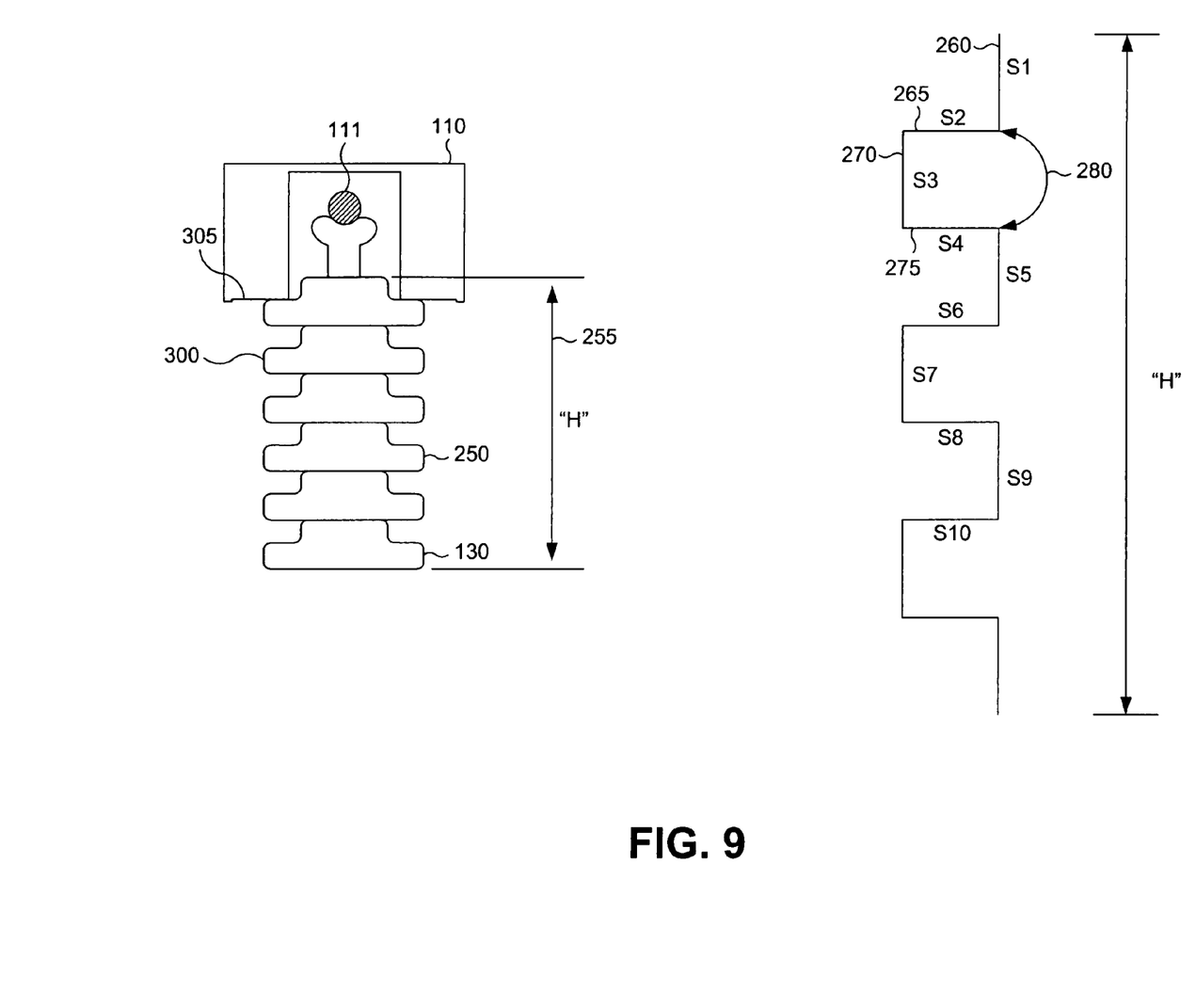
FIG. 9 is a pictorial representation that depicts application of one example embodiment of a conductor cover.

FIG. 9 is a pictorial representation that depicts application of one example embodiment of a conductor cover. One feature of the present conductor cover is that of preserving the dielectric integrity of an insulative support. As already discussed, an insulative support 130 typically comprises one or more skirts 250. The purpose of each skirt 250 is to provide for a longer dielectric distance than would ordinarily be available absent the skirts 250. For example, consider an insulative support of height "H" 255. Within this height "H" 255, the dielectric distance would ordinarily be limited to the distance "H" 255. By introducing a skirt 250, additional dielectric distance is realized. Again considering the figure, a portion of the dielectric distance with a skirt includes sections S1, S2, S3 and S4 (260, 265, 270 and 275). Accordingly, a non-skirted insulator would not include S2 and S4 (265 and 275).

One manner in which the dielectric integrity of an isolative support can be maintained is by preventing the occurrence of a bridge across a skirt 250. For example, feature 280 represents the bridging of the dielectric distance of a skirt. In this bridging example, the bridge represented by feature 280 would short out not only section S3 (270) but would also bridge across sections S2 and S4 (265 and 275). As such, this type of bridging would greatly reduce the dielectric distance originally provided by one skirt 250.

In order to prevent such bridging, one embodiment of a conductor cover includes an insulator cap 110 that provides a clearance 300 around an isolative support 130. This example embodiment of an insulator cap 110 also includes a stop 305 that prevents the isolative support from entering the cavity of the insulator cap 110 beyond a pre-established limit. Accordingly, by preventing the isolative support 130 from entering the cavity of the insulator cap 110, any potential bridging of a skirt 250 is substantially avoided. It should be noted that the isolative support 130 supports a conductor 111.

Figure 9A:
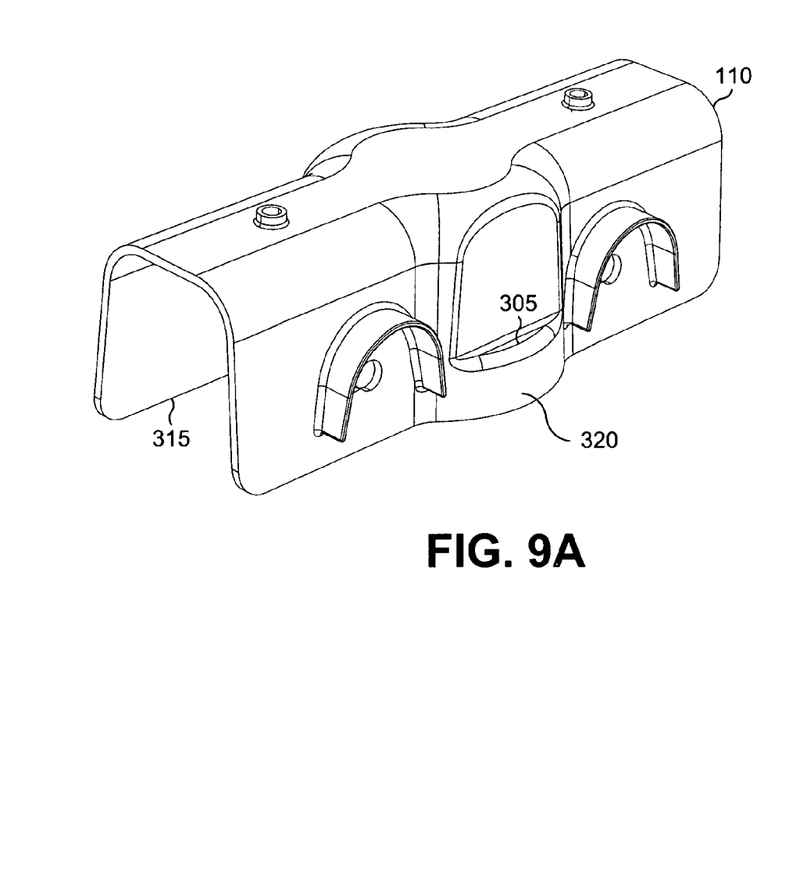
FIGS. 9A and 9B are pictorial diagrams that depict one alternative embodiment of an insulator cap.
Figure 9B:
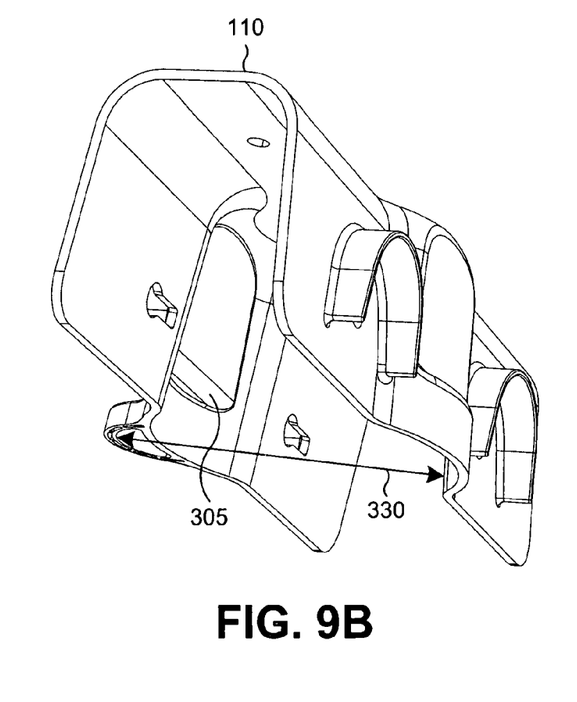

FIGS. 9A and 9B are pictorial diagrams that depict one alternative embodiment of an insulator cap. According to this alternative embodiment, an insulator cap 110 includes a stop 305 that prevents an isolative support from entering a cavity 315 formed by a shell formed by the insulator cap 110. According to this alternative embodiment, an insulator cap 110 forms a cavity that accepts a portion of a cable that emanates in both directions away from an isolative support. When the insulator cap 110 is disposed on an isolative support, any skirts included in the isolative support are not compromised. This feature is provided by a widened cavity section. The widened cavity section provides for a clearance about the isolative support. It should be noted that the widened cavity section is an optional feature. Another feature of this example embodiment is a stop 305. With the inclusion of a stop 305, the isolative support is not allowed to enter the cavity 315 to any appreciable amount that would bridge a skirt. It would become apparent after reading this specification that the use of a stop 305 and a widened cavity section 330 in conjunction with each other can be accomplished in a trade-off like manner. Accordingly, when a wider opening is provided, the isolative support can be allowed to further penetrate the cavity 315. As the clearance around the isolative support is reduced, the stop must allow progressively smaller portions of the isolative support to enter the cavity. This, again, to preclude the bridging of a skirt and the resulting compromise of dielectric strength provided by the isolative support.

Figure 10:
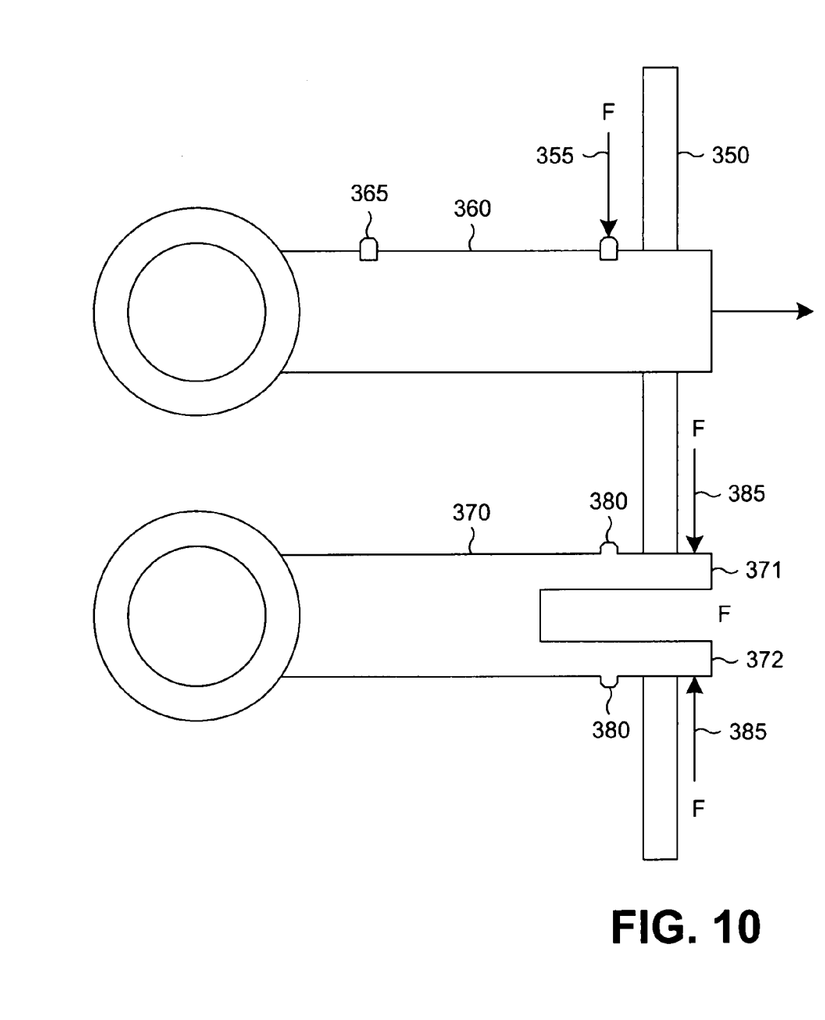
FIG. 10 is a pictorial diagram that illustrates various alternative embodiments of a restrictor pin.

FIG. 10 is a pictorial diagram that illustrates various alternative embodiments of a restrictor pin. According to one alternative embodiment, a restrictor pin 360 comprises spring-loaded obstacle 365. The spring-loaded obstacle is fashioned in a manner wherein the obstacle can be inserted through an opening in a side wall 350 of a conductor cover element. According to one alternative embodiment, the obstacle includes a feature that allows it to pass through the opening under application of sufficient force to overcome the static friction of the collision of the obstacle 365 and the side wall 350. As the restrictor pin 360 moves through the wall 350, the spring-loaded obstacle 365 will experience a downward force 355 greater than the force of a spring 357 included in this example embodiment of a restrictor pin 360. As such, the obstacle will enter into the restrictor pin 355 enabling the pin to move through the wall 350.

FIG. 10 illustrates yet another alternative embodiment of a restrictor pin 370. According to this alternative embodiment, the restrictor pin comprises two cantilevered protrusions (371, 372). These protrusions, according to one alternative embodiment, are formed by cutting a slot in a pin 370. It should be noted that the pin can have any cross-sectional shape (e.g. square or circular). This alternative embodiment of a pin 370 further comprises a detent disposed on the peripheral of the cantilevers (371, 372) (i.e. within the linear range of the slot). As the pin 370 is forced into a hole in the wall 350, the two cantilevers are force toward each other in order to allow the detents to move past the wall 350. This type of pin is useful for retaining a wide variety of conductor and electrical component covers in-place according to the teachings of the present method. For example, this pin can be used to secure in place a conductor cover, a cut-out cover and other coverings used to prevent inadvertent contact with electrically energized power distribution elements.

In yet another embodiment, a restrictor pin 460 includes a cantilevered end wherein two cantilevers 455 are structured with a positive and negative slope. When the pin is inserted into a whole, the positive slopes of the two cantilevers force 450 the cantilevers toward each other, enabling the pin to enter the whole. The negative slope then serves to retain the pin until a pre-established amount of withdrawal force is applied.

While this method and apparatus have been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for preventing undesired contact with an electrical conductor comprising:
    covering a portion of the conductor emanating in a first direction from an insulative support;
    preventing inadvertent exposure of the conductor emanating in the first direction by blocking a longitudinal opening included in a covering for the conductor; and
    covering a portion of the conductor proximate to the insulative support.

2. The method of claim 1 further comprising:
    covering a portion of the conductor emanating in a second direction from the insulative support; and
    preventing inadvertent exposure of the conductor emanating in the second direction.

3. The method of claim 1 wherein covering a portion of the conductor emanating in a first direction comprises:

covering a portion of the conductor emanating in a first direction from an insulative support; and allowing the conductor to freely pivot about a pivot point proximate to the insulative support.

4. The method of claim 1 wherein blocking a longitudinal opening included in a covering for the conductor comprises:

receiving a blocking pin under the conductor to a first limit when the blocking pin is angularly positioned in a first position;

receiving the blocking pin to a second limit when the blocking pin is rotated to a second position; and receiving the blocking pin to a third limit when the blocking pin is rotated to a third position.

5. The method of claim 1 wherein blocking a longitudinal opening included in a covering for the conductor comprises:

receiving a blocking pin under the conductor to a first limit when the insertion pressure force to the blocking pin exceeds a first pre-established limit; and receiving the blocking pin beyond the first limit when the insertion force applied to the blocking pin exceeds a second pre-established limit.

6. A conductor guard comprising:

insulator cap; and first arm having an internal envelope wherein said first arm is attached to and extends outward in a first direction from the insulator cap and wherein the first arm comprises opposing receptacles for receiving a restrictor pin across a longitudinal opening of an internal envelope included in said first arm.

7. The conductor guard of claim 6 further comprising second arm attached to and extending outward from the insulator cap in a second direction substantially opposed to the first direction.

8. The conductor guard of claim 6 wherein the first arm is pivotally attached to the insulator cap.

9. The conductor guard of claim 6 further comprising a restrictor pin wherein the restrictor pin comprises a first orthogonal stop protruding from the pin in a first direction and a second orthogonal stop protruding from the pin in a second direction.

10. The conductor guard of claim 6 and wherein the receptacles for a restrictor pin comprise a first keyed slot in a first shell of the internal envelope and a second keyed slot in a second shell of the internal envelope and wherein the first and second keyed slots are set concentric relative to an insertion point and wherein the keyways are set at disparate angles.

11. The conductor guard of claim 6 further comprising a restrictor pin wherein said restrictor pin comprises a pressure-sensitive insertion retardant.

12. The conductor guard of claim 6 wherein a shell of the internal envelope comprises a receptacle for receiving the restrictor pin to a first limit when the insertion force applied to the restrictor pin exceeds a first pre-established threshold and then further receives the restrictor pin beyond the first limit when the insertion force exceeds a second pre-established threshold.

13. The conductor guard of claim 6 wherein the insulator cap further comprises a receptacle for a restrictor pin wherein a conductor is prevented from escaping an internal envelope of the insulator cap when a restrictor pin is disposed in said receptacle.

* * * * *